United States Patent
Mejia et al.

(10) Patent No.: US 12,253,929 B1
(45) Date of Patent: *Mar. 18, 2025

(54) INTEGRATED PRODUCTION AUTOMATION FOR REAL-TIME MULTI-FREQUENCY DATA PROCESSING AND VISUALIZATION IN INTERNET OF THINGS (IoT) SYSTEMS

(71) Applicant: Enovate AI Corporation, The Woodlands, TX (US)

(72) Inventors: Camilo Mejia, Houston, TX (US); Daniel Martinez, Bogota (CO); Rebecca Nye, London (GB)

(73) Assignee: Enovate AI Corporation, The Woodlands, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/825,051

(22) Filed: Sep. 5, 2024

Related U.S. Application Data

(63) Continuation of application No. 18/613,907, filed on Mar. 22, 2024, now Pat. No. 12,111,745.

(51) Int. Cl.
 *G06F 11/32* (2006.01)
 *G06F 11/30* (2006.01)
 *G16Y 30/00* (2020.01)
 *H04L 41/16* (2022.01)

(52) U.S. Cl.
 CPC ........ *G06F 11/328* (2013.01); *G06F 11/3006* (2013.01); *G16Y 30/00* (2020.01); *H04L 41/16* (2013.01)

(58) Field of Classification Search
 None
 See application file for complete search history.

(56) References Cited

U.S. PATENT DOCUMENTS

| | | | |
|---|---|---|---|
| 7,149,287 B1 * | 12/2006 | Burger | H04M 7/1205 704/270 |
| 2020/0125389 A1 | 4/2020 | Palermo et al. | |
| 2021/0223993 A1 | 7/2021 | Esaka | |
| 2023/0338136 A1 | 10/2023 | Howard | |
| 2024/0108511 A1 | 4/2024 | Howard | |

* cited by examiner

*Primary Examiner* — Quang N Nguyen
(74) *Attorney, Agent, or Firm* — DLA PIPER LLP (US)

(57) ABSTRACT

A system comprising an interoperable digital architecture configured for real-time multi-frequency data collection, processing, and visualization of data from various IoT devices in real-time, an automated event detection module configured to detect events from the IoT devices in real-time and manage multi-frequency data, a modular AI module in communication with the automated event detection module, and configured to process the multi-frequency data in real-time through separate aggregated containers for increased computational efficiency, where the modular AI module is configured to parallelize AI processing, receive the multi-frequency data from the event detection module and processes it in parallel using a plurality of AI algorithms. A data sorting module configured to sort the processed multi-frequency data and send it to destinations across multiple cloud environments, and a relational database for segregation of raw multi-frequency data and processed multi-frequency data.

16 Claims, 8 Drawing Sheets

INTEGRATED PRODUCTION AUTOMATION FOR REAL-TIME MULTI-FREQUENCY DATA PROCESSING AND VISUALIZATION IN INTERNET OF THINGS (IoT) SYSTEMS

CROSS-REFERENCE TO RELATED APPLICATIONS

This is a continuation of U.S. application Ser. No. 18/613,907, filed Mar. 22, 2024, the content of which is herein incorporated by reference in its entirety.

FIELD

A system and method for real time data processing and management in Internet of Things (IoT) systems.

BACKGROUND

In the realm of Internet of Things (IoT) systems, data processing and management play a role in the efficient operation of these systems. IoT systems typically comprise a multitude of interconnected devices and sensors that generate a vast amount of data in real-time. This data, often referred to as multi-frequency data due to its diverse nature and varying update frequencies, is collected and processed for various purposes, such as monitoring system performance, detecting anomalies, and making informed decisions. The processing of this data often involves complex algorithms which can analyze and interpret the data to extract meaningful insights.

However, managing and processing this multi-frequency data in real-time presents several challenges. Traditional data processing architectures often struggle to handle the sheer volume, data format, data nomenclatures and diversity of data generated by IoT systems. Moreover, these architectures typically operate in a linear fashion, processing data sequentially, which can lead to bottlenecks, single point of system failure and delays, particularly when dealing with large volumes of data. Additionally, ensuring the secure and efficient transfer of processed data to various destinations, especially across multiple cloud environments, is a complex task due to varying cloud provider design, data structure requirements and cybersecurity. Furthermore, maintaining data integrity is a non-trivial task due to the mutable nature of raw data.

SUMMARY

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

In one aspect, the present disclosure relates to a system for processing and managing data in Internet of Things (IoT) systems, the system comprising an interoperable digital architecture configured for real-time multi-frequency data collection, processing, and visualization, the interoperable digital architecture is designed to process data from various IoT devices and sensors in real-time, an automated event detection module integrated within the interoperable digital architecture, configured to detect events from the IoT devices and sensors in real-time and manage multi-frequency data, a modular AI module integrated within the interoperable digital architecture, in communication with the automated event detection module, and configured to process the multi-frequency data in real-time through separate aggregated containers for increased computational efficiency, the modular AI module further configured to parallelize AI processing for simultaneous logic layers in real-time, wherein the AI module receives the multi-frequency data from the event detection module, and processes it in parallel using a plurality of AI algorithms, a data sorting module integrated within the interoperable digital architecture, in communication with the modular AI module, configured to sort the processed multi-frequency data and send it to predefined destinations across multiple cloud environments, and a relational database integrated within the interoperable digital architecture, in communication with the data sorting module, for segregation of raw multi-frequency data and processed multi-frequency data.

In embodiments of this aspect, the disclosure according to any one of the above example embodiments, wherein the automated event detection module is configured to process complex structures of the multi-frequency data from the IoT systems in real-time.

In embodiments of this aspect, the disclosure according to any one of the above example embodiments, wherein the data sorting module is further configured to send the processed multi-frequency data to the predefined destinations across the multiple cloud environments, regardless of a design of the cloud environments or data structure requirements.

In embodiments of this aspect, the disclosure according to any one of the above example embodiments, wherein the modular AI module is further configured to process the multi-frequency data in the separate aggregated containers, thereby increasing computational efficiency.

In embodiments of this aspect, the disclosure according to any one of the above example embodiments, wherein the modular AI module is further configured to parallelize the AI processing for the simultaneous logic layers in real-time.

In embodiments of this aspect, the disclosure according to any one of the above example embodiments, further comprising an automated alarm system configured for event recognition and data processing.

In embodiments of this aspect, the disclosure according to any one of the above example embodiments, wherein the relational database segregates raw multi-frequency data and processed multi-frequency data, facilitating efficient data management and retrieval.

In embodiments of this aspect, the disclosure according to any one of the above example embodiments, further comprising raw data hashed to assure the integrity of the data for tokenization and or blockchain applications.

In embodiments of this aspect, the disclosure according to any one of the above example embodiments, further comprising automated signed URLs with digital tokens for signature identification, ensuring secure and efficient data transfer.

In embodiments of this aspect, the disclosure according to any one of the above example embodiments, wherein the modular AI module further comprises multiple AI models operating in parallel, each AI model configured to process a subset of the multi-frequency data simultaneously, thereby increasing computational efficiency and enabling real-time processing of the multi-frequency data.

In one aspect, the present disclosure relates to a method for processing and managing data in Internet of Things (IoT) systems, the method comprising collecting data in real-time from various IoT devices and sensors using an interoperable digital architecture configured for real-time multi-frequency data collection, processing, and visualization, detecting events from the IoT devices and sensors in real-time and managing multi-frequency data using an automated event detection module integrated within the interoperable digital architecture, processing the multi-frequency data in real-time through separate aggregated containers for increased computational efficiency using a modular AI module integrated within the interoperable digital architecture, in communication with the automated event detection module, the modular AI module further configured to parallelize AI processing for simultaneous logic layers in real-time, wherein the AI module receives data from the event detection module, and processes it in parallel using a plurality of AI algorithms, sorting the processed multi-frequency data and sending it to predefined destinations across multiple cloud environments using a data sorting module integrated within the interoperable digital architecture, in communication with the modular AI module, and segregating raw multi-frequency data and processed multi-frequency data using a relational database integrated within the interoperable digital architecture, in communication with the data sorting module.

In embodiments of this aspect, the disclosure according to any one of the above example embodiments, wherein the detecting events includes processing complex structures of data from the IoT systems in real-time.

In embodiments of this aspect, the disclosure according to any one of the above example embodiments, wherein sorting the processed multi-frequency data includes sending the processed multi-frequency data to the predefined destinations across the multiple cloud environments, regardless of a design of the cloud environments or data structure requirements.

In embodiments of this aspect, the disclosure according to any one of the above example embodiments, wherein processing the multi-frequency data includes processing the multi-frequency data in the separate aggregated containers, thereby increasing computational efficiency.

In embodiments of this aspect, the disclosure according to any one of the above example embodiments, wherein processing the multi-frequency data further includes the parallelizing AI processing for the simultaneous logic layers in real-time.

In embodiments of this aspect, the disclosure according to any one of the above example embodiments, further comprising recognizing the events and processing data using an automated alarm system.

In embodiments of this aspect, the disclosure according to any one of the above example embodiments, wherein segregating raw multi-frequency data and processed multi-frequency data facilitates efficient data management and retrieval.

In embodiments of this aspect, the disclosure according to any one of the above example embodiments, further comprising hashing raw data to assure the integrity of the data for tokenization and or blockchain applications.

In embodiments of this aspect, the disclosure according to any one of the above example embodiments, further comprising generating automated signed URLs with digital tokens for signature identification, ensuring secure and efficient data transfer.

In embodiments of this aspect, the disclosure according to any one of the above example embodiments, wherein processing the multi-frequency data further comprises operating multiple AI models in parallel, each AI model configured to process a subset of the multi-frequency data simultaneously, thereby increasing computational efficiency and enabling real-time processing of the multi-frequency data.

BRIEF DESCRIPTION OF THE DRAWINGS

So that the way the above-recited features of the present disclosure can be understood in detail, a more particular description of the disclosure, briefly summarized above, may be made by reference to example embodiments, some of which are illustrated in the appended drawings. It is to be noted, however, that the appended drawings illustrate only example embodiments of this disclosure and are therefore not to be considered limiting of its scope, for the disclosure may admit to other equally effective example embodiments.

DETAILED DESCRIPTION

Figure 1:
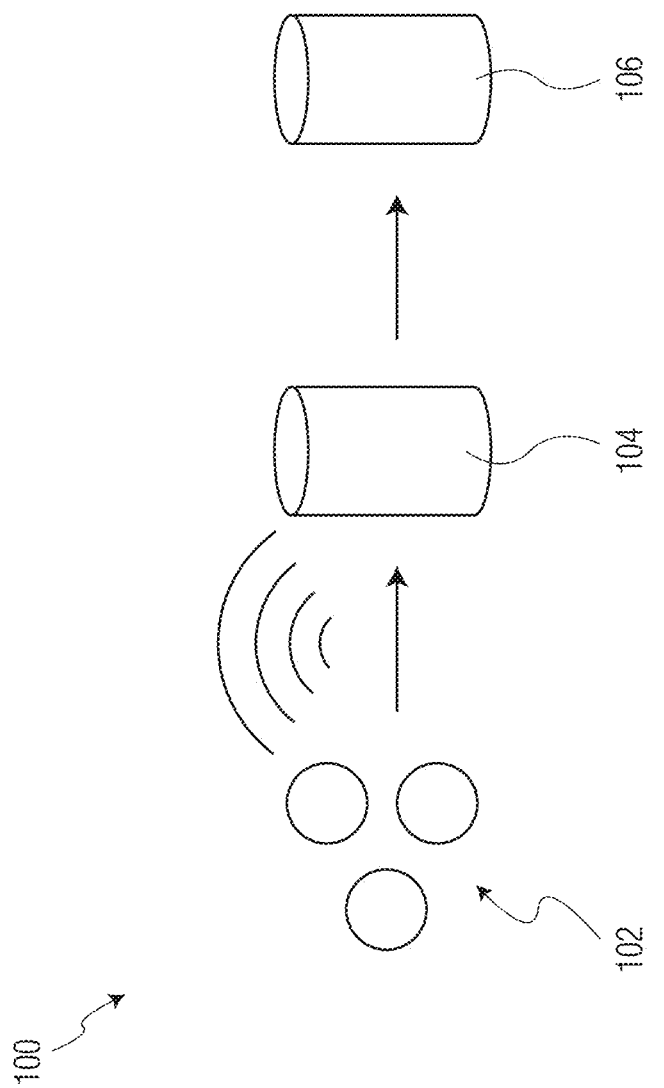
FIG. 1 is a block diagram illustrating a conventional Internet of Things (IoT) data processing system.

Various example embodiments of the present disclosure will now be described in detail with reference to the drawings. It should be noted that the relative arrangement of the components and steps, the numerical expressions, and the numerical values set forth in these example embodiments do not limit the scope of the present disclosure unless it is specifically stated otherwise. The following description of at least one example embodiment is merely illustrative in nature and is in no way intended to limit the disclosure, its application, or its uses. Techniques, methods, and apparatus as known by one of ordinary skill in the relevant art may not be discussed in detail but are intended to be part of the specification where appropriate. In the examples illustrated and discussed herein, any specific values should be interpreted to be illustrative and non-limiting. Thus, other example embodiments may have different values. Notice that similar reference numerals and letters refer to similar items in the following figures, and thus once an item is defined in one figure, it is possible that it need not be further discussed for the following figures. Below, the example embodiments will be described with reference to the accompanying figures.

The following description sets forth examples of the present disclosure. It should be recognized, however, that such description is not intended as a limitation on the scope of the present disclosure. Rather, the description also encompasses combinations and modifications to those examples described herein.

The present disclosure relates to systems and methods for processing and managing real time data in Internet of Things (IoT) systems. More specifically, the disclosure pertains to an interoperable digital architecture designed for real-time multi-frequency data collection, processing, and visualization. The architecture is capable of processing data from a variety of IoT devices and sensors in real-time, thereby enhancing the responsiveness and efficiency of data management in IoT systems.

The disclosed system is adept at monitoring IoT devices across one or more industry platforms from multiple geographical locations and languages. These IoT devices are beneficial to the system's ability to gather multi-frequency IoT sensor data (e.g., raw data) in real-time, which is beneficial for maintaining operational efficiency and pre-empting potential issues. Upon receipt of new data, the system promptly analyzes it to determine the appropriate AI models for processing. The selection of AI models is contingent on the nature of the data and the desired outcomes of the analysis. These models operate in parallel, processing the data concurrently to synthesize predictions and recommendations. This parallel processing not only expedites the analysis but also enhances the accuracy and relevance of the insights derived. Once processed, the data is accessible by the end user via secure URLs and a user dashboard for periodized user identification.

In one example, an industry platform may be a gas drilling platform equipped with a network of IoT sensors that continuously monitor various drilling parameters such as drill bit torque, rotational speed, downhole pressure, and temperature. These sensors generate a high volume of multi-frequency data, reflecting the dynamic and complex nature of drilling operations. The data collected is diverse, with some sensors providing real-time feedback, while others offer periodic updates.

To manage and process this data effectively, the integrated production automation system utilizes an array of AI models, each tailored to interpret specific aspects of the drilling process. For instance, one AI model may specialize in predicting drill bit wear based on torque and rotational speed data, while another may focus on forecasting potential pressure-related complications using downhole pressure readings.

As new data streams are received from the devices, the system's automated event detection module rapidly identifies any anomalies or patterns that require immediate attention. Concurrently, the modular AI module selects and applies the appropriate AI models to process the incoming data. This parallel processing capability allows for the simultaneous analysis of different data sets, leading to a comprehensive understanding of the drilling operation's current state.

The insights gained from the AI models are then transformed into predictions and actionable recommendations. For example, if a potential issue with drill bit wear is detected or predicted, the system may suggest a reduction in drilling speed or a change in the drill bit itself. These recommendations are not just based on current data but also take into account historical trends, predictive and prescriptive analytics, ensuring that the end users receive well-informed advice to optimize drilling operations.

Once processed, the data, along with the AI-generated recommendations, is sorted by the data sorting module and securely transmitted to the end user's dashboard via automated securely signed URLs. These URLs ensure that the data is accessible in a secure and efficient manner, regardless of the end user's location or the cloud environment they are operating in.

An end user dashboard (displayed on the user device) presents the processed data and recommendations in an intuitive and interactive format, allowing drilling operators to make informed decisions swiftly. The real-time visualization of data and recommendations on the dashboard is beneficial in enhancing operational efficiency, safety, and overall productivity on the gas drilling platform.

This example illustrates the system's capability to not just handle the volume and variety of IoT generated data but also to deliver real-time, data-driven insights and recommendations that are directly actionable by the end users, thereby revolutionizing the management and optimization of complex industrial operations.

While the aforementioned gas drilling platform example is used to describe the system's robust capabilities in a specific industry, it is noted that the integrated production automation system is versatile and can be adapted to a multitude of other industry platforms. For instance, in the manufacturing sector, the system may be employed to monitor assembly lines equipped with IoT sensors tracking production metrics such as machine uptime, throughput, and quality control parameters. By leveraging the system's real-time data processing and AI-driven predictive maintenance, manufacturers may preempt equipment failures, optimize production schedules, and enhance product quality.

Similarly, in the realm of smart cities, the system may be utilized to manage and analyze data from traffic sensors, environmental monitoring stations, energy consumption, energy pricing and public safety devices. The ability to process multi-frequency data in real-time may enable city administrators to make swift, data-informed decisions to improve traffic flow, monitor air quality, energy supply and deploy emergency services more effectively. The system's scalability and interoperability ensure that it can integrate seamlessly with various IoT devices and sensors, making it a comprehensive solution for data-driven decision-making across diverse industry platforms.

It is noted that each industry platform may have selectable AI models tailored to the industry-specific equipment and end user requirements. These specialized AI models are designed to address the distinct challenges and nuances of each industry, ensuring that the data processing and analysis are both relevant and effective for the specific context. For example, in the agricultural sector, AI models might focus on optimizing crop yields and monitoring soil conditions, while in healthcare, models may prioritize patient monitoring and predictive diagnostics. This customization allows the system to provide actionable insights that are directly applicable to the end user's operational environment, thereby maximizing the benefits of IoT data processing and management.

In other words, the system's intelligent automation may facilitate dynamic selection of AI models, which can be automatically determined based on sensor data characteristics or the specific requirements of the industry platform in use. This dynamic selection process is driven by statistical algorithms that assess the incoming data and match it with the database infrastructure and AI models that are optimized for that particular type of data or industry scenario. Conversely, the system also provides the flexibility for manual selection of AI models by industry operators. Leveraging their domain expertise and experience, operators can set specific AI models that they deem appropriate for the data at hand or for addressing particular operational challenges. This manual supervision allows for a tailored approach where the insights and recommendations provided by the AI models can be fine-tuned to align with the operator's strategic objectives and operational knowledge. Whether through automated or manual supervision, the system ensures that the AI models deployed are well-suited to deliver actionable insights, thereby enhancing the decision-making capabilities within IoT environments and blockchain frameworks Within the integrated production automation system, the AI models may operate independently to make separate predictions based on their specialized areas of focus. For instance, one model might predict equipment failure while another forecasts energy consumption trends. Alternatively, these AI models have the capability to fuse their outputs, creating coordinated comprehensive predictions that consider the interplay of various factors. This fusion of outputs enables a holistic analysis, providing a more complete picture of the operational state and potential future scenarios. By leveraging both individual and combined insights from multiple AI models, the system can deliver nuanced recommendations that account for a wide range of variables, thereby enhancing decision-making processes and operational outcomes.

The system will now be described with respect to the figures. It is noted that any examples provided are not limiting.

Referring to FIG. 1, a conventional data processing system 100 is depicted. In some aspects, the conventional data processing system 100 may include a sensor array 102, an IoT industrial control unit 104 which may include a Supervisory Control and Data Acquisition (SCADA) platform and a programmable logic controller (PLC), and an AI processing unit 106. The sensor array 102 may capture data from various sources, such as IoT devices or sensors. This data may then be transmitted to the IoT SCADA PLC unit 104 for initial processing.

In some cases, the IoT SCADA PLC unit 104 may process the data received from the sensor array 102 and forward the processed information to the AI processing unit 106. The AI processing unit 106 may further analyze the processed information and make decisions based on the analysis. The flow of data from the sensor array 102, through the IoT SCADA PLC unit 104, to the AI processing unit 106, represents the sequential stages of data acquisition, processing, and intelligent analysis within the conventional data processing system 100.

In some embodiments, the sensor array 102, the IoT SCADA PLC unit 104, and the AI processing unit 106 may be configured to operate in real-time, thereby enabling the conventional data processing system 100 to respond rapidly to changes in the data. In other embodiments, the sensor array 102, the IoT SCADA PLC unit 104, and the AI processing unit 106 may operate in a batch mode, processing data at predetermined intervals.

The conventional data processing system 100, as depicted in FIG. 1, presents several limitations that can hinder the efficiency and effectiveness of data management in IoT systems. The system's architecture, comprising a sensor array 102, an IoT SCADA PLC unit 104, and an AI processing unit 106, is typically characterized by a linear and sequential data flow that can lead to multiple issues including but not limited to sequential data processing, scalability concerns, limited real-time processing, single point of failure, inflexibility across cloud environments, data integrity concerns, delayed decision making and poor data management.

The architecture disclosed herein offers a transformative approach to data management in IoT systems when compared to the conventional architecture shown in FIG. 1. Unlike the linear and sequential data flow of the conventional system, which is prone to bottlenecks, single point of failures and scalability issues, the present system employs a parallel processing strategy that allows for the simultaneous analysis of multi-frequency data from multiple source of databases and or IoT placements. This not only accelerates the processing speed but also enhances the accuracy and relevance of the insights derived due to statistical correlation of the data from multiple locations used for the AI models to improve over time. Furthermore, the present architecture's modular AI module, automated event detection, and data sorting capabilities enable real-time, efficient, and secure data handling across multiple cloud environments. The modular AI module may dynamically determine parallelization of data processing by routing the data to appropriate AI models (e.g. AI algorithms in separate aggregated containers) based on the data characteristics and the specific requirements of the industry platform. This integrated approach ensures that data integrity is maintained, optimization of the self-learning process and actionable insights are delivered promptly to end users, thereby greatly improving decision-making and operational efficiency in IoT environments. The disclosed architecture is described in more detail below.

Figure 2:
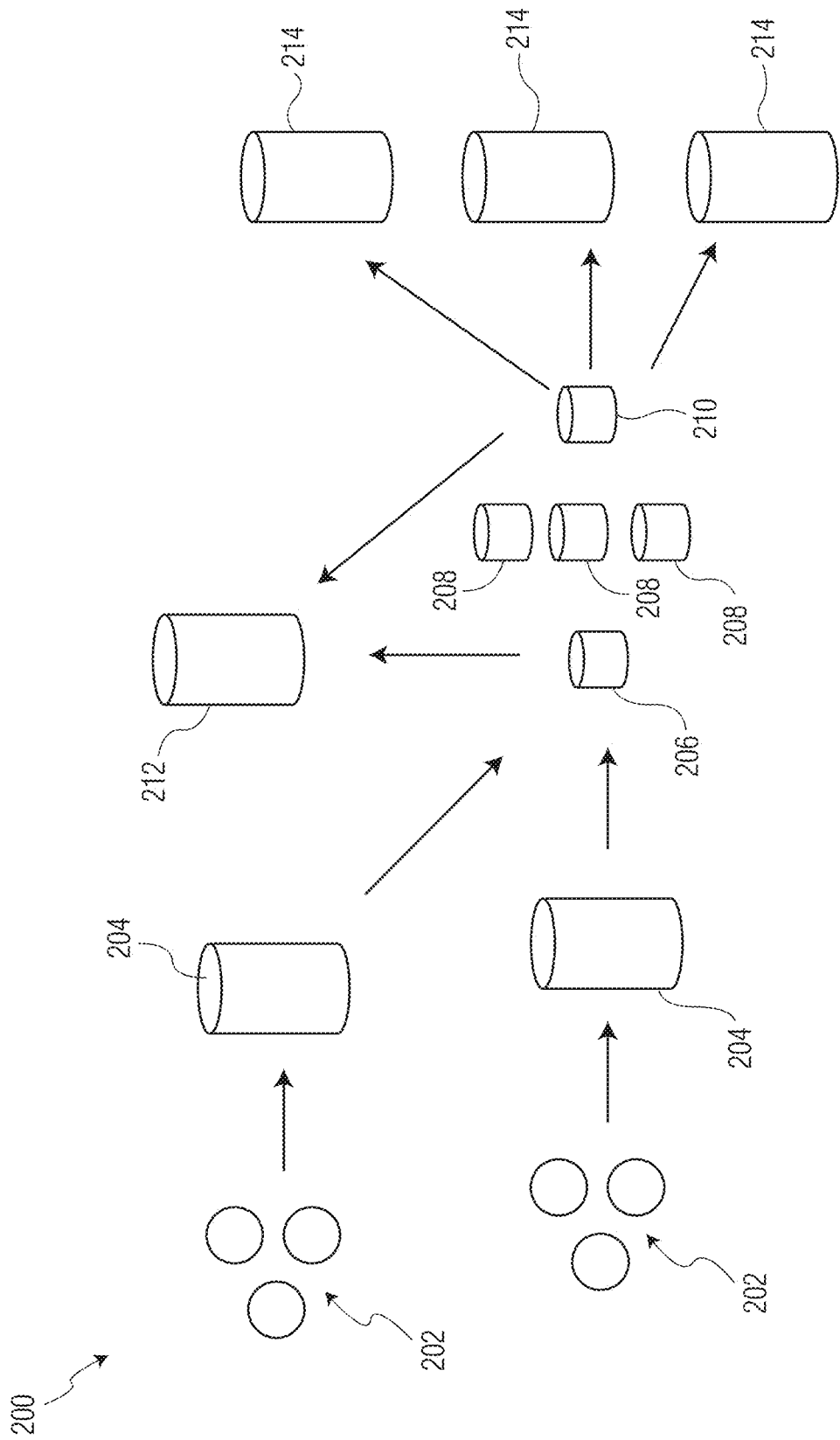
FIG. 2 is a block diagram showing an integrated parallelized system for processing and managing data from IoT devices, according to aspects of the present disclosure.

Referring now to FIG. 2, a block diagram 200 illustrates the flow of data within an integrated system for processing and managing data from IoT devices. In some aspects, sensors 202 may detect signals and transmit the resultant data to an IoT SCADA PLC system 204. The data is then processed by an AI layer including a module 206 for automated event detection of received sensor data and hashing of the data secured by a blockchain system 212. The AI layer includes AI data processing module(s) 208 that are selected according to analyze and manage the data in a parallelized manner depending in part on relevant AI models. The processed data is stored in a data sorting module 210 and is also secured by a blockchain system 212, ensuring data integrity and security. Data sorting module 210 also performs data sorting and allocation into databases 214 as well as agnostic automated signed URLs for access by end users to view the processed data on a user interface not shown.

The AI preprocessing module 206 is a component of the integrated system, performing two primary functions including but not limited to automated event detection, data structuring and automated data hashing. Upon receiving the multi-frequency data from the IoT devices, the module 206 employs algorithms to identify any anomalies or patterns that may indicate potential issues or opportunities for optimization. This real-time event detection is beneficial in maintaining the operational integrity of the IoT system and enabling proactive responses to dynamic conditions. Concurrently, module 206 applies cryptographic hashing to the data, leveraging blockchain technology to secure the integrity of the data. This ensures that once data is recorded, it cannot be altered without detection, providing a robust layer of security that is particularly valuable in applications where data authenticity, data provenance and non-repudiation are beneficial.

Parallel AI models within the AI data processing module 208 then take over the task of analyzing the IoT data. These models operate concurrently, each specializing in different aspects of the data to provide a comprehensive analysis. By running in parallel, these AI models can process vast amounts of data simultaneously, drastically reducing the time it takes to derive actionable insights from the data. This parallelization is a stark contrast to traditional sequential data processing methods, which can become overwhelmed by the volume and velocity of data generated by modern IoT systems. The ability to analyze data in real-time is a cornerstone of the system's capability to support dynamic and responsive IoT environments.

The data sorting module 210 then organizes the AI processed data. In other words, after the AI models have completed their analysis, the sorting module 210 categorizes the data and allocates it into various databases 214 (e.g., relational databased, etc.). This structured approach to data management facilitates quick retrieval and efficient utilization of the processed information. Moreover, the module 210 is responsible for generating agnostic automated signed URLs, which serve as secure gateways for end users to access the processed data via automated pulling or pushing mechanisms. These URLs are designed to be cloud-agnostic, ensuring that end users can retrieve their data from any cloud environment or edge devices, thereby enhancing the system's flexibility and user accessibility.

In some embodiments, Blockchain or distributed ledgers technology can be seamlessly integrated into the solution, serving as a foundational element for data security and integrity. By securing the processed data with blockchain, the system can ensure that each piece of data is verifiable and tamper-evident. This application of blockchain is particularly beneficial in environments where data provenance and traceability are of concern. The immutable nature of blockchain, combined with the system's real-time processing capabilities, provides a high level of trust and reliability in the data, which is beneficial for making informed decisions based on IoT data analytics.

For example, in the context of the gas drilling platform, the integrated production automation system depicted in FIG. 2 may process drilling data as follows: Sensors 202 on the drilling platform collect real-time multi-frequency data, such as torque, pressure, and temperature readings. This data is transmitted to the IoT SCADA PLC system 204, where initial processing occurs. The AI preprocessing module 206 then can perform automated event detection to identify any anomalies or patterns indicative of potential issues, while also applying cryptographic hashing to secure the data's integrity via the blockchain system 212. Subsequently, the AI data processing module 208, utilizing parallel AI models, can analyze the data to provide a comprehensive and rapid assessment. The data sorting module 210 categorizes the analyzed data and generates cloud-agnostic automated signed URLs, enabling end users to securely access the processed data and AI-generated recommendations through a user interface. These insights and recommendations are presented in an intuitive format, allowing drilling operators to make informed decisions swiftly, thereby enhancing operational efficiency and preemptive maintenance strategies.

Figure 3:
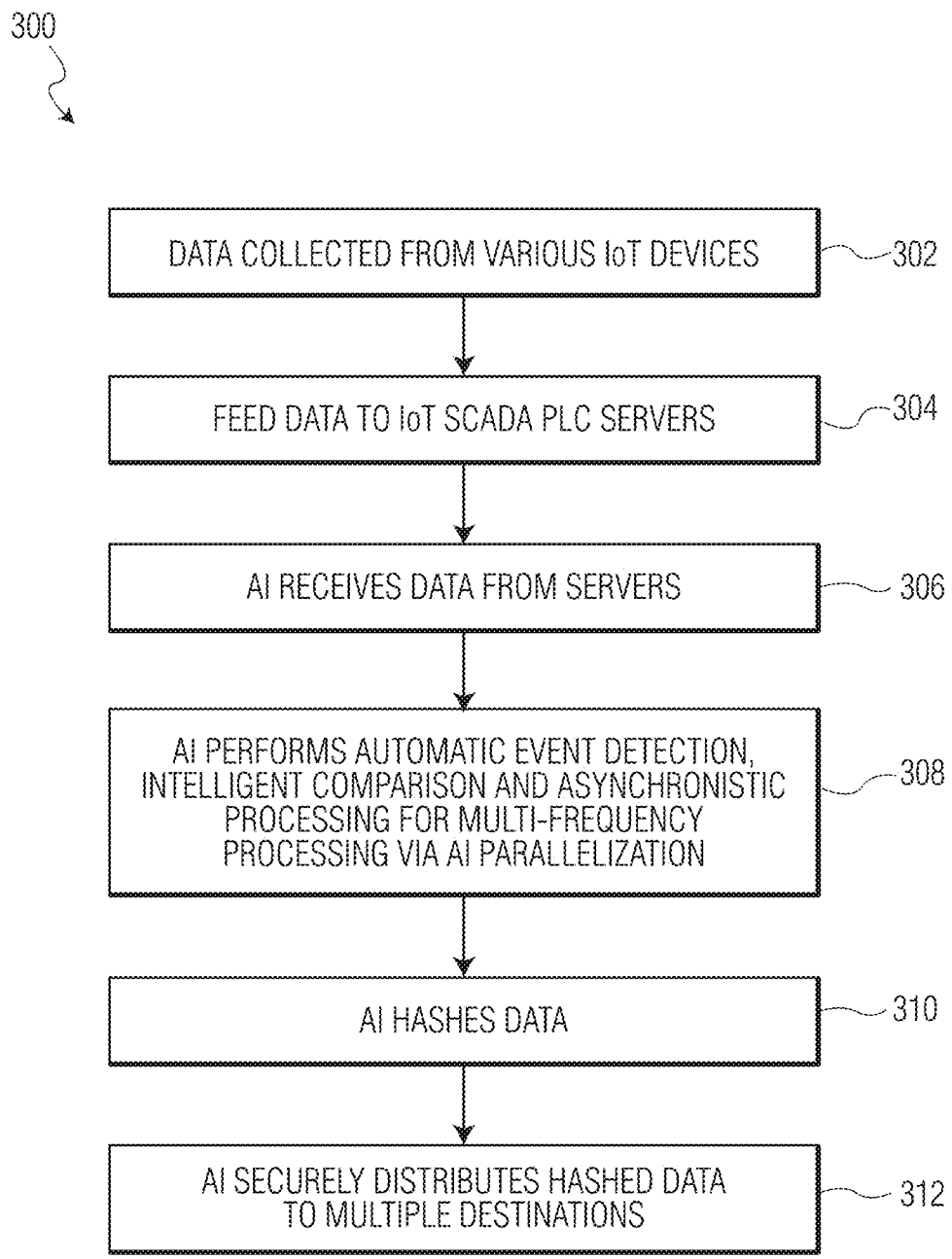
FIG. 3 is a flowchart depicting a data processing method for the AI/IoT system in FIG. 2, according to aspects of the present disclosure.

Referring now to FIG. 3, a flowchart of a data processing method 300 for an AI/IoT system according to the block diagram in FIG. 2 is depicted. In some aspects, the process 300 may begin at the IoT data collection step 302, where data is collected from various IoT devices. As mentioned above, the data collection may occur in real-time, allowing for immediate processing and analysis of the data. The collected data may include a variety of data types, such as temperature readings, pressure measurements, or other sensor data, depending on the specific IoT devices in use.

Following the IoT Data Collection step 302, the data may be fed to SCADA PLC servers in step 304. In some cases, these servers may be configured to receive and process the collected data, preparing it for further analysis. The servers may also be configured to handle multi-frequency data, allowing for the processing of data from a variety of sources and at various frequencies. Subsequently, AI data reception step 306 may take place, where an AI system receives the processed data from the servers. In some aspects, the AI system may be configured to handle large volumes of data, enabling it to process and analyze the data in real-time. Following the AI data reception step 306, the AI event detection and processing step 308 may occur. In this step, the AI system may perform automatic event detection, intelligent comparison, and asynchronistic processing for multi-frequency processing via AI parallelization. This may involve the AI system detecting events or changes in the data, comparing the new data with historical data, and processing the data in an asynchronistic manner. This may enhance the system's ability to respond to events and manage data.

The system may determine the number and types of AI models to choose for analysis through a multi-step process that includes data characterization, model selection criteria, accuracy representation and dynamic model allocation. This process is designed to ensure that the AI models selected are well-suited to the characteristics of the data and the desired outcomes of the analysis. Initially, the system may characterize the incoming multi-frequency data based on various attributes such as data type, volume, velocity, variety, and veracity. This characterization helps in understanding the complexity and nature of the data, which is beneficial in selecting the appropriate AI models. Subsequently, the system may apply model selection criteria that may include factors such as the predictive and prescriptive performance of the models, their computational efficiency, and their suitability for the specific data types identified during characterization. The criteria also consider the real-time processing requirements and the ability of the models to handle the multi-frequency aspect of the data.

Dynamic model allocation is then employed, where the system uses an AI-driven decision engine to determine the number and types of AI models to deploy. The decision engine analyzes the characterized data against the model selection criteria and allocates the models that are predicted to yield the optimum balance of accuracy and performance. The system may continuously monitor the performance of the models and can dynamically adjust the selection in response to changes in data patterns or system objectives. The combination of these steps ensures that the system selects the appropriate number and types of AI models for the analysis, enabling it to process and manage the multi-frequency data effectively and efficiently.

While dynamic model allocation offers the flexibility to adapt to changing data patterns and system objectives, it is also possible for the system to employ a static model selection approach. In scenarios where the data characteristics and processing requirements for a particular industry platform are well-understood and stable over time, the system may predefine a fixed set of AI models to be used for analysis. This static selection of models can streamline the processing workflow by eliminating the overhead associated with dynamic model evaluation and allocation. Static model selection can be advantageous and efficient in systems with predictable data patterns or when computational resources are limited, as it allows for the optimization of model performance and resource allocation in advance.

AI data hashing step 310 may then be executed, where the AI system hashes the data to ensure integrity. This may involve the AI system applying a hash function to the data, generating a hash value that can be used to verify the integrity of the data. This feature may enhance the security and integrity of the data, thereby improving the reliability of the system. The process 300 may conclude with AI data distribution step 312, where the AI system securely distributes the hashed data to multiple destinations. This may involve the AI system sending the processed data to predefined destinations across multiple cloud environments, regardless of the design of the cloud environments or data structure requirements. This feature may enhance the system's flexibility and interoperability across different cloud environments.

In a drilling operation, for example, the integrated production automation system's data processing method may function as follows: during the IoT data collection step 302, sensors on the drilling platform gather real-time multi-frequency data, such as torque, pressure, and temperature readings, which are indicative of the drilling operation's current state. This data is then transmitted to SCADA PLC servers in step 304, where initial processing and standardization occur to prepare the data for advanced analysis. The AI data reception step 306 follows, with an AI system receiving the processed data and preparing it for event detection and analysis. In the AI event detection and processing step 308, the AI system employs algorithms to detect anomalies or patterns that may signal potential issues or optimization opportunities, comparing new data against historical data to make informed predictions. The AI data hashing step 310 ensures the integrity of the data by applying cryptographic hashing, making the data secure and immutable for applications such as blockchain. In the AI data distribution step 312, the processed and hashed data is securely distributed to predefined destinations across multiple cloud environments, ensuring that the data is accessible and actionable for end users, regardless of their cloud infrastructure, thereby enhancing decision-making and operational efficiency in the drilling operation.

It is noted that in some cases, the steps of the process 300 may be performed in a different order, or some steps may be omitted. Additionally, other steps may be added to the process 300.

Figure 4:
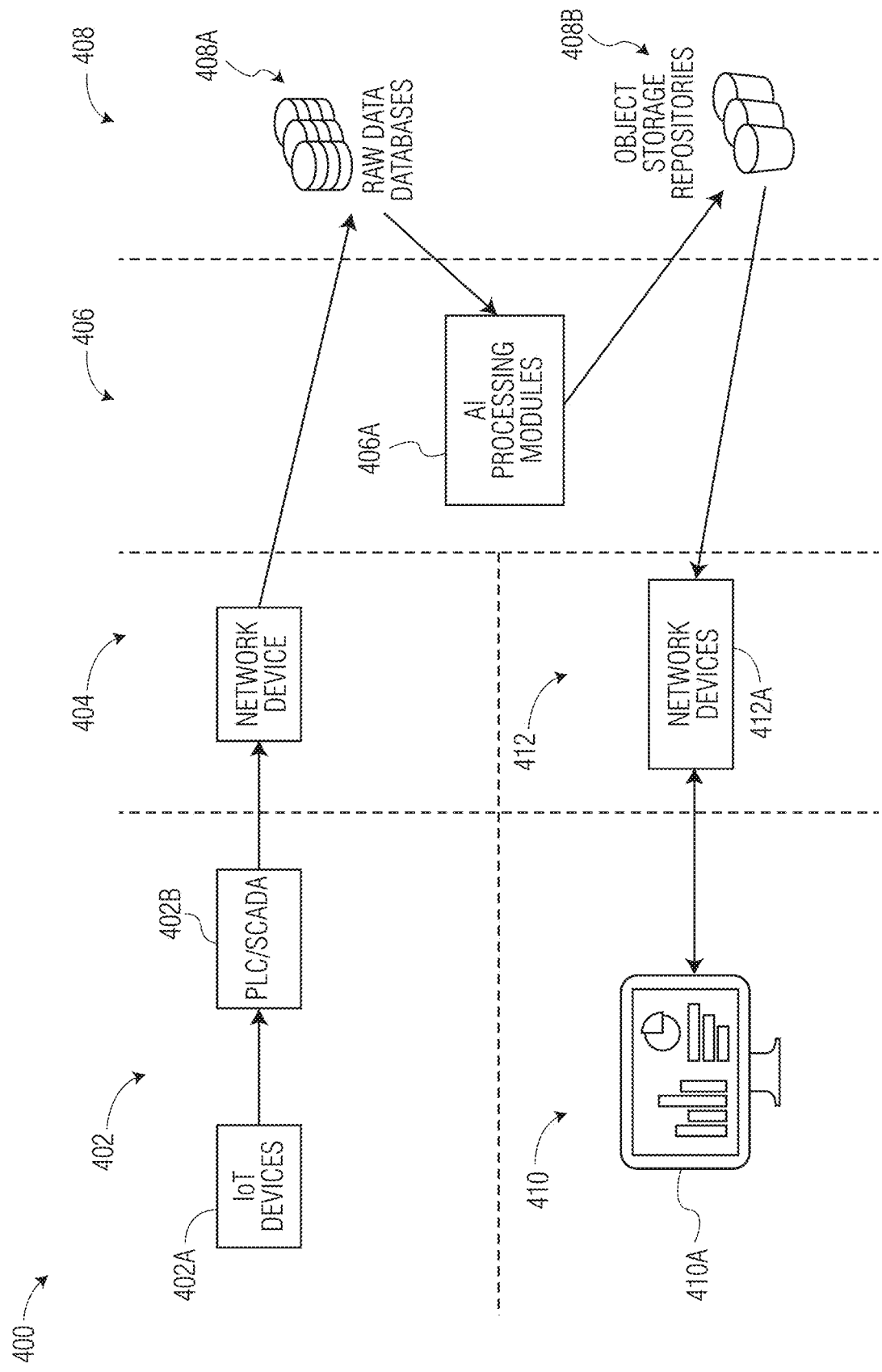
FIG. 4 is a block diagram illustrating the architecture and multi-layer configuration of an Integrated Production Automation (IPA) platform, according to aspects of the present disclosure.

FIG. 2 illustrated the IPA architecture at a high level. Referring now to FIG. 4, a detailed block diagram of the IPA architecture 400 is depicted. In some aspects, the architecture system overview 400 may include a data generation layer 402, a networking input layer 404, networking output layer 412 a business logic layer 406, a data access layer 408, and a visualization layer 410.

The data generation layer 402 may collect raw data through IoT sensors 402A and PLC/SCADA 402B. This raw data may include a variety of data types, such as temperature readings, pressure measurements, or other sensor data, depending on the specific IoT devices in use. In some cases, the data generation layer 402 may collect the data in real-time, allowing for immediate processing and analysis of the data.

On the software backend, the system provides IPA operators with a user interface that facilitates the addition, deletion, and modification of IoT platforms and sensors under monitoring. This interface serves as a centralized control panel, enabling operators to seamlessly manage the array of devices and platforms that constitute the IoT ecosystem. Operators can input and update a wide range of information through this interface, including platform and IoT device identification information for distinguishing and tracking the multitude of devices within the system. Additionally, technical parameters specific to each device or platform can be configured, ensuring that the system is attuned to the operational characteristics and requirements of the monitored entities. Networking information for establishing and maintaining communication with the IoT devices, can also be managed via the user interface. This may include servers being used, network addresses, protocols, and authentication credentials that enable secure and reliable data transmission between the IoT devices and the system's architecture. By providing operators with the tools to manage these details, the system ensures that the data flow from the IoT devices is not just uninterrupted but also conforms to the security and operational standards set forth by the organization. The user interface is designed to be intuitive, reducing the complexity involved in managing a sophisticated IoT network and thereby enhancing the overall efficiency of the monitoring process.

In addition to the user interface, the system may also be equipped with an API that automates the management of IoT platforms and sensors. This API enables addition, deletion, and modification of IoT devices and platforms, for example, based on requests from the IoT ecosystem itself. For instance, when a new IoT device is activated within the network, the API can automatically register the device, update its technical parameters, and integrate it into the system without manual intervention. Similarly, the API can process requests to decommission devices or update network configurations in response to changes within the IoT environment. This automation capability ensures that the system remains up-to-date and responsive to the dynamic nature of IoT operations, further streamlining the management process and reducing the potential for human error.

In either case, the collected raw data may then be transmitted to the networking input layer 404 which may include various networking input layer devices 404A (e.g., routers, switches, gateways, and network interface controllers) that receives the IoT data and passes it to the data access layer 408 for storage prior to AI analysis. In the data access layer 408, the raw data may be stored within an object storage repository 408A. The object storage repository 408A may be configured to store large volumes of data, enabling the system to handle the high volume of data generated by the IoT devices.

Once stored, the raw data may be sent to the business logic layer 406 for processing. The business logic layer 406 may include business logic layer AI processing modules 406A that processes the data and then stores the processed data in a processed data storage database 408B for deployment to the end user. The business logic layer AI processing modules 406A may be configured to process the data in real-time, thereby enhancing the system's ability to respond to events and manage data.

It is noted that the business logic layer AI processing modules 406A may be executing on one or more servers, which are equipped with the requisite computational resources to handle the intensive tasks associated with AI data analysis. These servers may be standalone or part of a distributed network, providing the scalability and processing power to analyze large datasets in parallel. The modular design of the AI processing modules allows for the distribution of computational tasks across multiple servers, optimizing the use of resources and ensuring that data processing is both efficient and effective. This distributed computing approach is particularly advantageous when dealing with the high volume and velocity of data generated by IoT devices, as it enables the system to maintain real-time processing capabilities while managing the complexity of multi-frequency data analysis.

The processed data may then be made available to the visualization layer 410 through the visualization layer user devices 410A via the networking output layer 412 and networking output layer devices 412A (e.g., routers, switches, gateways, and network interface controllers). The visualization layer 410 may allow for real-time monitoring and control of systems, as indicated in the real-time monitoring step 512. It is noted that the visualization layer user devices 410A may include a variety of network (internet) connected end-user interfaces such as desktop computers, laptops, tablets, smartphones, and smartwatches. These devices can be used by operators, engineers, and decision-makers to access, monitor, and interact with the processed data. Additionally, specialized devices such as augmented reality (AR) headsets or virtual reality (VR) goggles may be employed to provide immersive data visualization experiences. Industrial control panels and digital signage displays may also serve as user devices within the visualization layer, offering real-time data insights in operational environments.

The architecture's distributed nature across multiple networks and devices enables it to handle the complexities of IoT systems effectively. By leveraging a network of interconnected servers and devices, the architecture can distribute the computational load, allowing for the parallel processing of data streams from a multitude of IoT sensors and devices. This distribution is facilitated by the networking input layer, which acts as a conduit, channeling raw data from the data generation layer to various nodes within the system for processing. Each node, equipped with AI processing modules, operates independently yet in concert with others, ensuring that data is analyzed promptly and efficiently. This modular approach not only scales with the increasing volume of data but also provides redundancy, enhancing the system's reliability and fault tolerance.

Furthermore, the architecture's ability to distribute processing tasks across different networks and devices enables it to be resilient and adaptable to varying network conditions and device capabilities. For instance, edge computing devices can perform initial data processing close to the data source, reducing latency and bandwidth usage, while more complex analysis can be offloaded to powerful cloud-based servers. This hybrid processing strategy ensures that real-time data processing demands are met without compromising on the depth and quality of analysis. As a result, the architecture can support a wide range of IoT applications, from simple monitoring tasks to sophisticated predictive and prescriptive analytics, making it a versatile solution for the dynamic landscape of IoT systems.

Figure 5:
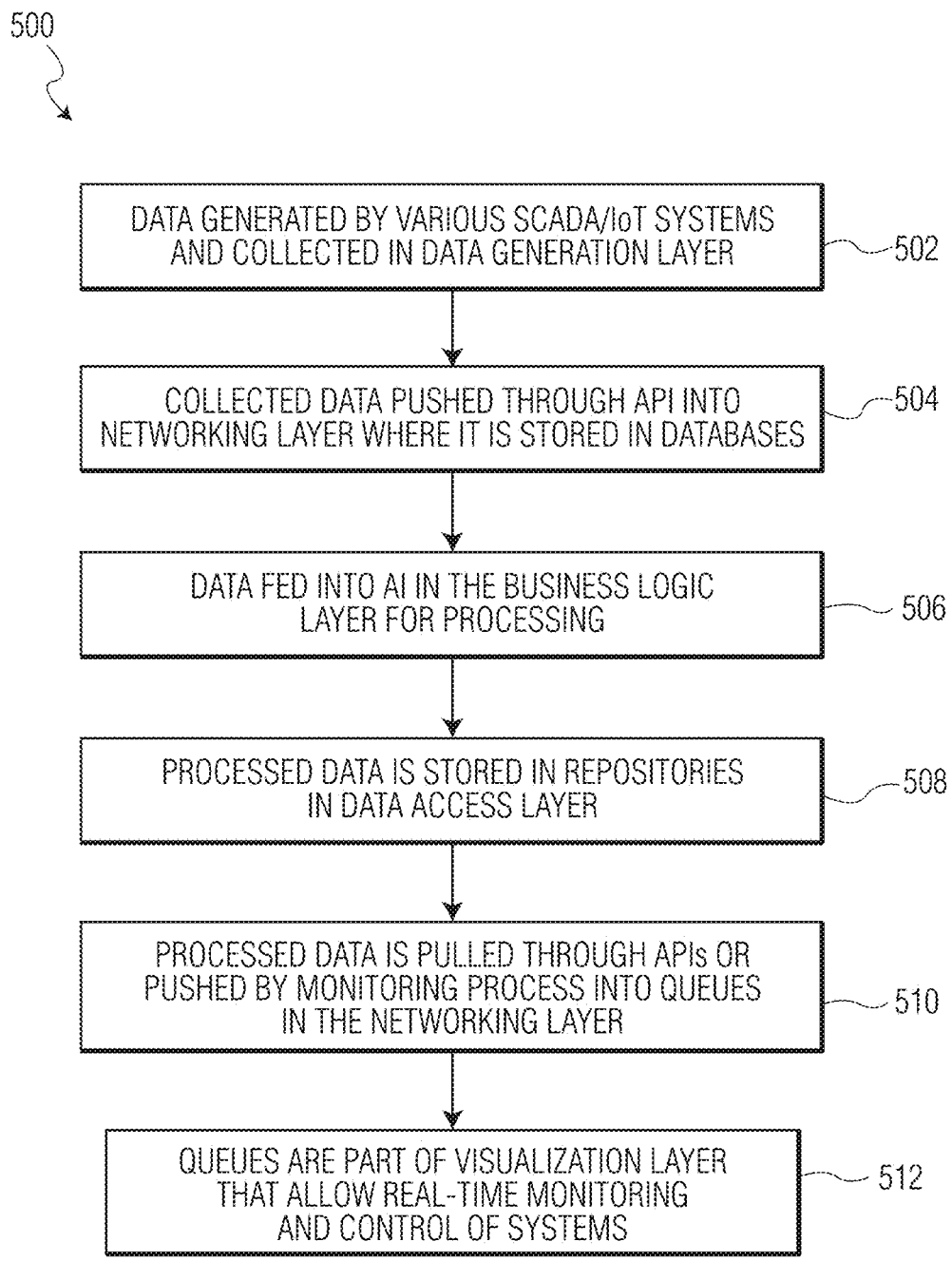
FIG. 5 is a flowchart outlining the data processing workflow in the IPA platform in FIG. 4, according to aspects of the present disclosure.

Referring now to FIG. 5, a flowchart 500 illustrates the data processing workflow within the IPA architecture shown in FIG. 4. The flowchart 500 begins with the data generation step 502, where data is generated by various SCADA/IoT systems. This data may include a variety of data types, such as temperature readings, pressure measurements, or other sensor data, depending on the specific IoT devices in use. In some cases, the data generation step 502 may occur in real-time, allowing for immediate processing and analysis of the data.

Following the data generation step 502, the API data push step 504 takes place. In this step, the collected data is pushed through an API into the networking layer where it is stored in databases. The API data push step 504 may involve transmitting the data from the IoT devices to a server or other data storage device. In some aspects, the API data push step 504 may be performed in real-time, thereby enabling the system to respond quickly to changes in the data.

Subsequently, the AI processing step 506 is executed. In this step, the data is fed into AI in the business logic layer for processing. The AI processing step 506 may involve the AI system analyzing the data, detecting events or changes in the data, and processing the data in an asynchronistic manner. This may enhance the system's ability to respond to events and manage data. Once processed, the data is stored in repositories in the data access layer, as depicted in the data storage step 508. The data storage step 508 may involve storing the processed data in a database or other data storage device. In some cases, the data storage step 508 may be performed in real-time, thereby enhancing the system's ability to respond to changes in the data.

The processed data is then either pulled through APIs or pushed by a monitoring process into queues in the networking layer, as shown in the data distribution step 510. The data distribution step 510 may involve transmitting the processed data to predefined destinations across multiple cloud environments, regardless of the design of the cloud environments or data structure requirements. This feature may enhance the system's flexibility and interoperability across different cloud environments.

These queues are part of the visualization layer that allows real-time monitoring and control of systems, as indicated in the real-time monitoring step 512. The real-time monitoring step 512 may involve displaying the processed data on a user interface, allowing users to monitor and control the systems in real-time. In some aspects, the real-time monitoring step 512 may be performed in real-time, thereby enabling the system to respond quickly to changes in the data.

The queues are components of the data distribution mechanism within the system, acting as intermediaries that manage the flow of processed data to the end users. These queues hold the processed data temporarily and are responsible for ensuring that the data is delivered in an organized and efficient manner. Each piece of processed data within the queues is associated with a corresponding automated signed URL. These URLs are dynamically generated by the system and serve as secure access points for the end users to retrieve the processed data. The URLs are designed to be cloud-agnostic, meaning they can be used to access data across various cloud environments without compatibility issues.

When the processed data is ready for distribution, the system pushes the signed URLs into the queues. The queues then relay these URLs to the client service bus queue, which acts as a messaging system that notifies the end users of the availability of new processed data. The end users receive these notifications along with the signed URLs, which they can use to securely access and download the processed data from the designated data storage repositories. The use of signed URLs ensures that the data transfer is secure and that each URL is uniquely tied to specific processed data, maintaining the integrity and confidentiality of the data. This mechanism allows for real-time monitoring and control of systems, as the end users can access the latest processed data as soon as it becomes available, enabling them to respond promptly to any changes or insights derived from the data.

The automated signed URLs generated by the system function as secure, temporary gateways for end users to access the processed data. These URLs incorporate digital tokens that serve as signature identifiers, which authenticate the user and verify the integrity of the URL. The cloud-agnostic design of the URLs ensures compatibility across different cloud service providers, facilitating seamless data access for users operating in diverse cloud environments.

To maintain security and control over data access, the signed URLs are programmed to expire after a predetermined period. This expiration is a security measure that prevents unauthorized access to the data after the URL has outlived its intended use. Once a URL expires, it becomes invalid, and the data it pointed to can no longer be accessed through that specific URL. If access to the same data is still desired post-expiration, a new signed URL will be generated upon request, subject to the system's authentication and authorization protocols.

The expiration time frame for each signed URL can be configurable based on the sensitivity of the data and the operational requirements of the system. For instance, URLs for data that is frequently updated may have shorter expiration times to ensure that users are accessing the latest information, while URLs for more static data may remain valid for longer periods. The system's ability to dynamically generate and manage the lifecycle of signed URLs is a testament to its robust data security and distribution capabilities, ensuring that data is accessed securely and efficiently while adhering to strict governance policies.

It is noted that the steps of the process 500 may be performed in a different order, or some steps may be omitted. Additionally, other steps may be added to the process 500.

Figure 6:
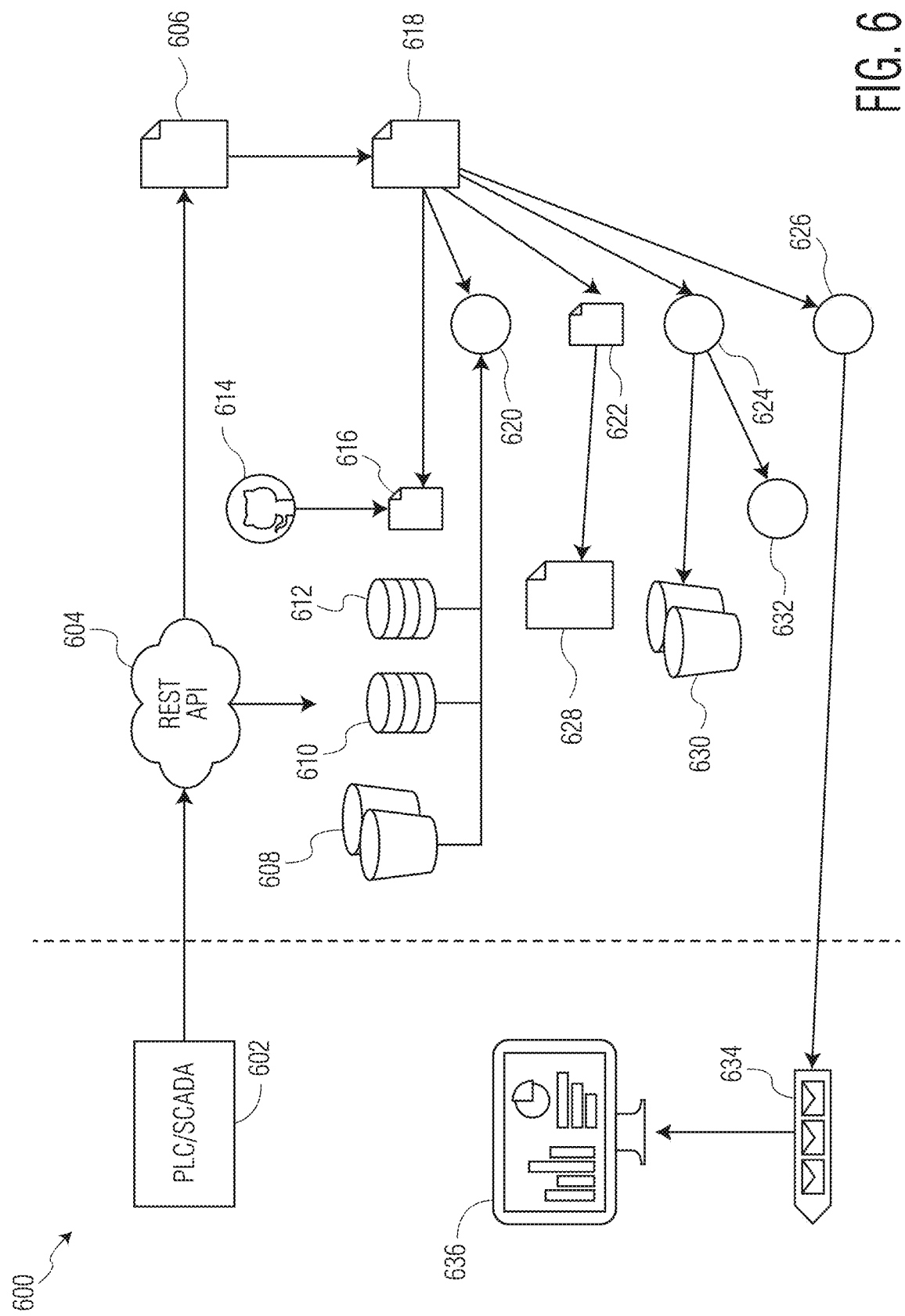
FIG. 6 is a process flow diagram of the automated one-step trigger design of the IPA automation process executed by the IPA platform, according to aspects of the present disclosure.

While FIG. 4 provided a detailed block diagram of the IPA architecture, showcasing the various layers and components involved in the data procession trigger, FIG. 6 delves into the IPA process itself at the software level. This process flow diagram illustrates the sequence of operations that take place from the moment data is sent from the PLC SCADA system to the final visualization on the user dashboard. It encapsulates the dynamic interactions between the system's components, including data storage, processing scripts, result uploads, and the generation of secure URLs for data access. This depiction of the IPA process complements the architectural overview by demonstrating how the system's components work in concert to facilitate the end-to-end processing of IoT data, ultimately leading to actionable insights for the users.

Specifically, FIG. 6 depicts a process flow of the IPA process 600. In some aspects, data may be sent from a PLC SCADA system 602 to an API 604. The API 604 may be configured to store new data in input raw data storage databases 610 and input configuration data storage databases 612. In some cases, an automated or manual IPA monitor script 606 may be included in the system. The IPA monitor 606 may be configured to listen for new raw data input and execute a main script, represented by script 618, when new data is detected. This script may execute a bootstrap 616 in response to IPA repo module 614 for version quality process (i.e., 614 may be responsible for managing the different versions of the AI models and scripts used in the system), and a get data script 620 to retrieve the raw input data, the configuration input data, and the external input files from the databases 610, 612 and from the external input files storage 608. It may then run the machine learning code script 622, generate the corresponding result CSV files 628, perform upload script 624 to upload the result CSV files to repositories 630, generate the corresponding signed URLs 632 and the corresponding result JSON files 626 with the signed URLs. The flow may then send the generated result JSON files with the signed URLs to client service queue 634 to be consumed by the user via dashboard 636.

In this context, scripts are essentially written in scripting languages, which are programming languages designed for integrating and communicating with other programming languages or components within a system. Unlike compiled programs, scripts do not require a separate compilation step and are typically interpreted directly by a runtime engine or a scripting host. This means that scripts can be written, modified, and executed on-the-fly, making them ideal for tasks that require flexibility and rapid development. In the context of the IPA system, scripts automate the processing of data as it flows through the system's architecture. When new data arrives from IoT devices, a monitoring script, such as the IPA monitor 606, is triggered. This script listens for incoming data and initiates the execution of other scripts in response to specific events or conditions. For example, upon detecting new data, the main script 618 is executed, which in turn may call upon other scripts like the bootstrap 616 to initialize the system's environment, and the get data script 620 to retrieve the relevant data from storage databases 610, 612, and external input files storage 608.

Once the data is retrieved, the machine learning code script 622 processes it, applying complex algorithms to analyze and derive insights from the raw data. The results of this analysis are then formatted into CSV files 628, which are uploaded to data repositories 630 using the upload script 624. To facilitate secure access to these results, the system generates signed URLs 632, which are embedded within result JSON files 626. These JSON files, complete with secure access URLs, are then pushed to the client service queue 634, where they are made available to end users through the client visualization dashboard 636. This seamless execution of scripts enables the IPA system to efficiently manage the flow of data from collection to visualization, providing users with timely and actionable information.

It is noted that in some embodiments, the steps of the process 600 may be performed in a different order, or some steps may be omitted. Additionally, other steps may be added to the process 600.

Figure 7:
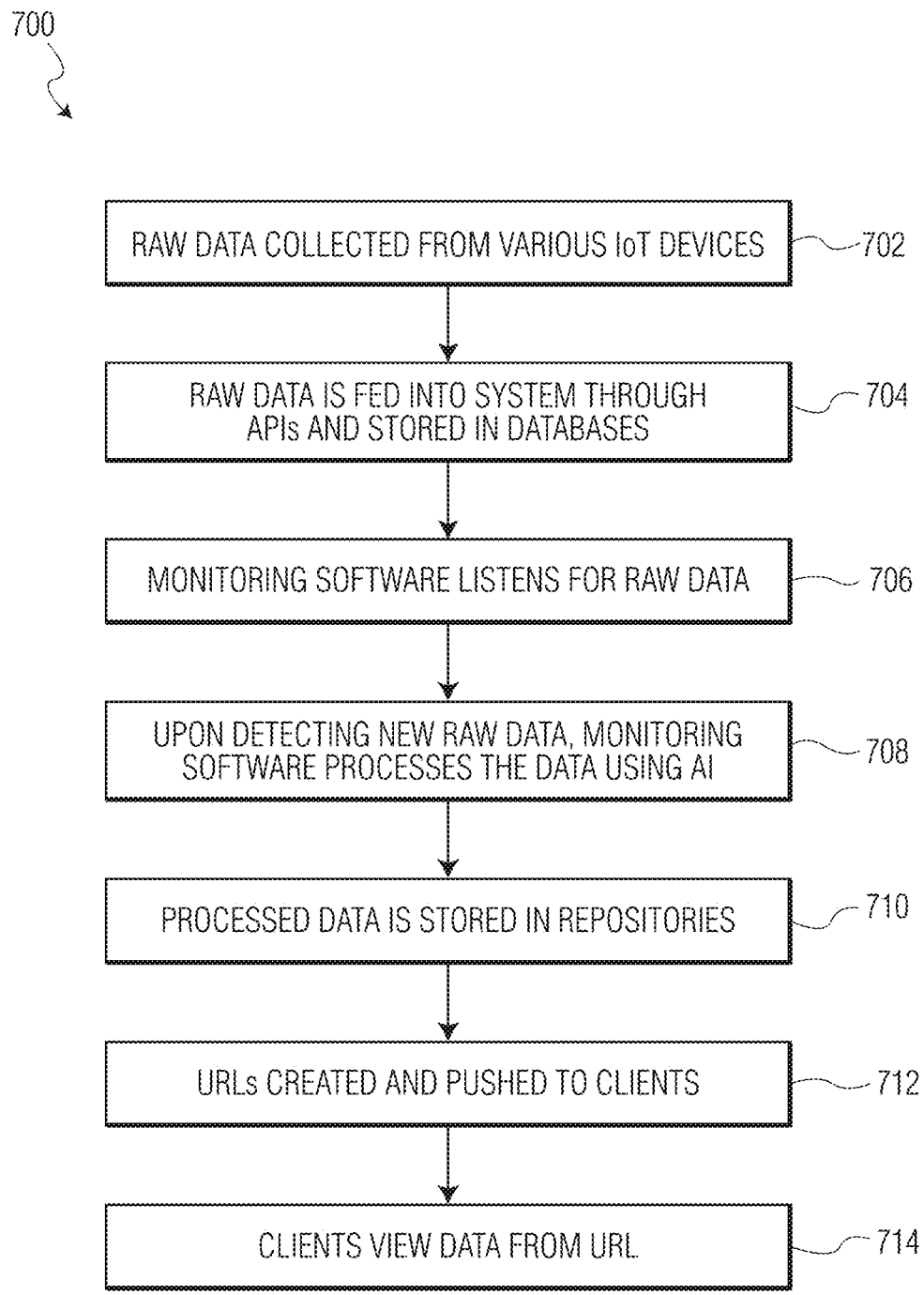
FIG. 7 is a flowchart depicting the steps involved in the data processing of the IPA automation process in FIG. 6, according to aspects of the present disclosure.

Referring now to FIG. 7, a flowchart 700 outlines the steps involved in the data processing workflow of an automated system, such as the one shown in FIG. 6. In some aspects, the process 700 may begin with the IoT data collection step 702, where raw data is gathered from various IoT devices. This data collection may occur in real-time, allowing for immediate processing and analysis of the data. The collected data may include a variety of data types, such as temperature readings, pressure measurements, or other sensor data, depending on the specific IoT devices in use.

Following the IoT data collection step 702, the data input and storage step 704 may take place. In this step, the collected data is fed into the system through an API and stored in databases. This step may involve transmitting the data from the IoT devices to a server or other data storage device. In some cases, the data input and storage step 704 may be performed in real-time, thereby enabling the system to respond quickly to changes in the data.

Subsequently, the data monitoring step 706 can be executed. In this step, monitoring software listens for new raw data. Upon detecting new raw data, the monitoring software can trigger the next step in the process. This real-time monitoring capability may enhance the system's ability to respond to events and manage data. Once new raw data is detected, the AI data processing step 708 may occur. In this step, the data is fed into an AI system in the business logic layer for processing. The AI system may analyze the data, detect events or changes in the data, and process the data in an asynchronistic manner. This may enhance the system's ability to respond to events and manage data.

Following the AI data processing step 708, the data repository storage step 710 may take place. In this step, the processed data can be stored in repositories. The data repository storage step 710 may involve storing the processed data in a database or other data storage device. In some cases, the data repository storage step 710 may be performed in real-time, thereby enhancing the system's ability to respond to changes in the data.

The processed data is then either pulled through APIs or pushed by a monitoring process into queues in the networking layer, as shown in the URL distribution step 712. The URL distribution step 712 may involve creating URLs that are pushed to clients, allowing them to access the processed data. This feature may enhance the system's flexibility and interoperability across different cloud environments.

These queues are part of the visualization layer that allows real-time monitoring and control of systems, as indicated in the data access step 714. The data access step 714 may involve displaying the processed data on a user interface, allowing users to monitor and control the systems in real-time. In some aspects, the data access step 714 may be performed in real-time, thereby enabling the system to respond quickly to changes in the data.

It is noted that in some embodiments, the steps of the process 700 may be performed in a different order, or some steps may be omitted. For example, the AI data processing step 708 and the data repository storage step 710 may be performed simultaneously, or the URL distribution step 712 may be performed before the data repository storage step 710. Additionally, other steps may be added to the process 700, such as a data validation step before the AI data processing step 708, or a data encryption step before the URL distribution step 712.

In the context of drilling operations, the architecture and process flow depicted in FIGS. 4 and 6 may be used to optimize energy consumption and minimize equipment wear and tear on drilling equipment. The system may begin by collecting real-time data from a network of IoT sensors strategically placed on drilling equipment. These sensors monitor parameters such as drill bit torque, rotational speed, downhole pressure, and temperature which are indicators of drilling efficiency and equipment health. This multi-frequency data, varying in update intervals and data types, is then transmitted to the system's networking input layer, where it is stored in the object storage repository for subsequent processing.

The business logic layer, equipped with AI processing modules, performs complex computations on the collected data. Utilizing machine learning algorithms, the system identifies patterns that indicate suboptimal energy usage or potential equipment failure. For instance, an increase in drill bit torque beyond a threshold may suggest excessive energy consumption or impending wear. The AI modules run in parallel, allowing for simultaneous analysis of different data streams, which accelerates the processing and enhances the accuracy of the insights. This parallel processing is a departure from traditional sequential data analysis, enabling the system to provide real-time recommendations.

Once the data is processed, the data sorting module categorizes the insights and securely transmits them to the end user's dashboard via automated signed URLs. These URLs, which are cloud-agnostic, ensure that the recommendations are accessible in a secure and efficient manner, regardless of the end user's location or the cloud environment they are operating in. The dashboard presents the recommendations in an intuitive format, enabling drilling operators to swiftly adjust operations. For example, the dashboard may suggest reducing the drilling speed to conserve energy or scheduling maintenance to replace a drill bit, thereby avoiding unexpected downtime and equipment damage.

The end user accesses these recommendations by opening the provided URL, which leads to the client visualization dashboard. Here, the user can see a comprehensive view of the drilling operation's status, including real-time data visualizations and AI-generated advice. The dashboard may display trends in energy consumption over time, highlight areas where efficiency can be improved, and alert the user to any abnormal equipment behavior that may lead to increased wear and tear. By following these data-driven recommendations, the end user can make informed decisions to optimize drilling operations, reduce energy costs, and extend the lifespan of their equipment.

Upon accessing the client visualization dashboard, the user is presented with a user-friendly interface that displays a variety of data representations. Data values are shown in real-time, with numerical readouts that update instantaneously as new data is received from the IoT devices. These values may include current measurements such as temperature, pressure, torque, and rotational speed, providing the user with an immediate understanding of the drilling operation's status.

Figure 8:
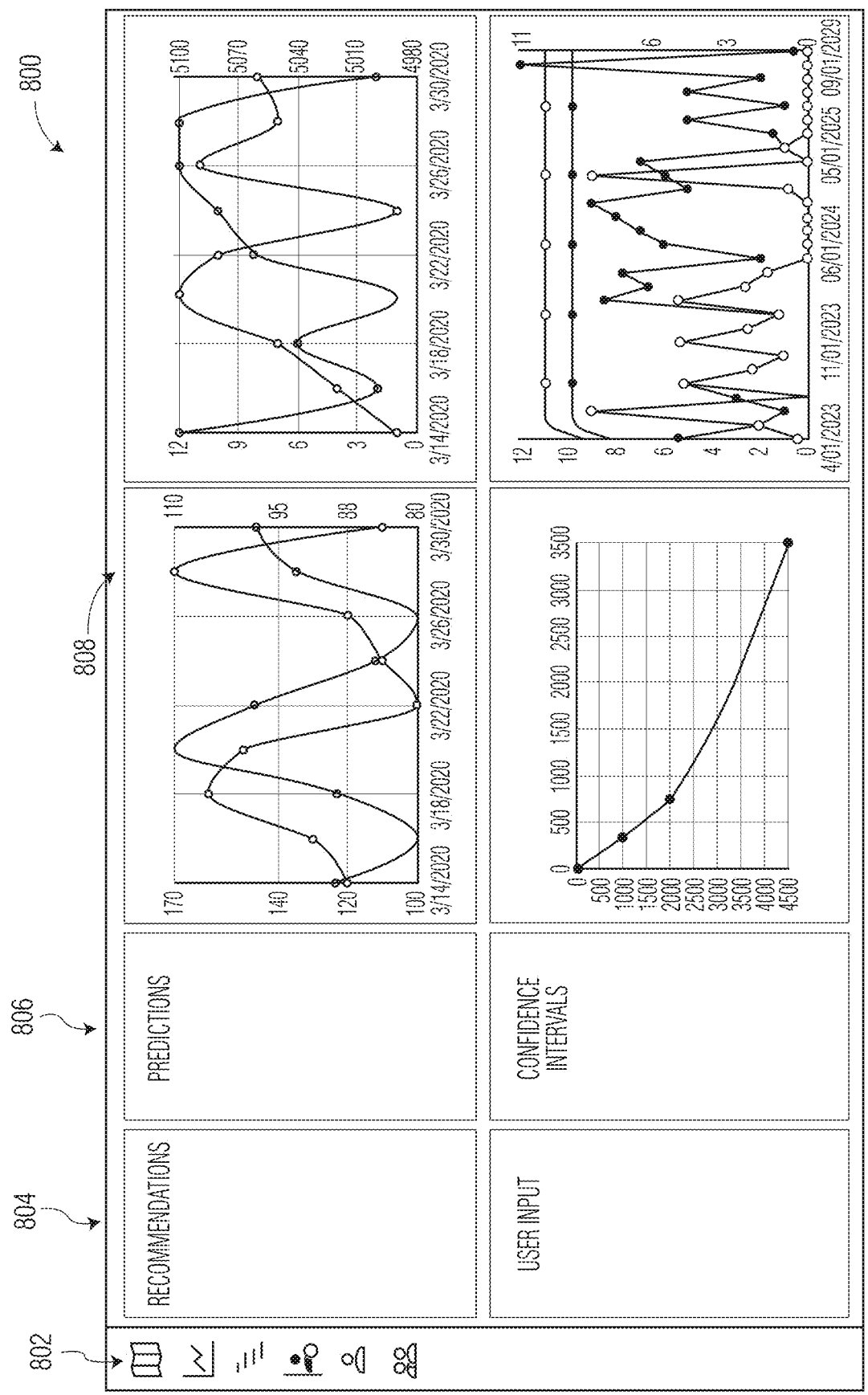
FIG. 8 is an example of a user dashboard, according to aspects of the present disclosure.

An example of a user dashboard is shown as dashboard configuration 800 in FIG. 8. It is noted that dashboard 800 is just one example of a dashboard layout. The dashboard layout may be initially configured by the IPA operator to provide a standardized interface, while also offering extensive personalization options to accommodate the preferences of individual end users. This flexibility allows users to tailor the dashboard layout, select which data points to monitor, generate automated reports and configure notification settings to align with their specific operational roles and decision-making processes.

The client visualization dashboard 800 in FIG. 8 may be designed to provide a comprehensive and interactive experience for end users, enabling them to monitor, analyze, and make decisions based on real-time IoT data. In one example, window 808 may serve as the interactive graphics and data plots display, offering users a dynamic visual representation of the data collected from IoT devices. This window allows users to engage with various graphical formats such as line charts, bar graphs, and heat maps, which can be manipulated to view different data points and trends. The interactivity of window 808 enables users to zoom in on specific time frames, compare data sets, and visualize the impact of different operational scenarios, thereby facilitating a deeper understanding of the system's performance.

In one example, window 806 may provide predictions, utilizing the power of AI models to forecast future conditions and potential outcomes. This window may presents predictive analytics in an accessible format, allowing users to view projected trends and anticipate operational changes. The predictions are based on a combination of historical data analysis and real-time data inputs, offering insights into future performance metrics such as energy consumption, downtime, equipment wear, and operational efficiency. Window 806 may also include confidence intervals and predictive scoring to help users gauge the reliability of the forecasts, enabling them to plan and respond proactively to upcoming events or anomalies.

In one example, window 804 may be a hub for recommendations and user input, where the AI-generated advice is presented to the user in a clear and actionable manner. This window not only displays suggestions for optimizing operations and preempting equipment failures but also allows users to provide feedback and input on the recommendations. Users can accept, modify, or reject the AI suggestions, and their input is used to refine the AI models for improved future recommendations. Additionally, window 804 may facilitate a two-way interaction, enabling users to request specific analyses or reports, thereby customizing the decision-making process to their individual requirements and preferences.

In one example, window 802 may provide a user menu for managing the dashboard, offering a streamlined and user-friendly interface for navigating the various features and settings. This window may allow users to configure their dashboard view, set up alerts and notifications, manage their account settings, and access help and support resources. The user menu is designed to be intuitive, ensuring that users of all technical levels can effectively utilize the dashboard to monitor and control their IoT systems. With window 802, users can personalize their dashboard experience, making it a powerful tool for managing complex IoT environments and making data-driven decisions.

Data graphs may be featured on the dashboard, offering visual representations of both real-time and historical data. These graphs may include line charts that track the progression of specific parameters over time, bar graphs that compare data across different intervals, and pie charts that illustrate the distribution of various operational metrics. The historical data is accessible through interactive charts that allow users to zoom in on specific time frames, compare past and present data, and identify long-term trends.

Predicted data can also be visualized on the dashboard, with projections based on the analysis of historical and real-time data by the AI models. Predictive graphs may show expected future values of operational parameters, providing foresight into potential issues or opportunities for optimization. These predictions are accompanied by confidence intervals that communicate the level of certainty associated with the forecasts.

The predictions and recommendations generated by the AI models can be displayed in a clear and actionable format. Recommendations may appear as alerts or notifications that draw the user's attention to urgent matters, or as a list of suggested actions that can be taken to improve efficiency or prevent equipment failure. For example, the dashboard may recommend adjusting the drilling speed to reduce energy consumption or scheduling maintenance for a component that is predicted to fail soon. These recommendations are prioritized based on their urgency and potential impact on the operation, enabling the user to make timely and informed decisions.

Each element on the dashboard is designed to be intuitive and interactive, allowing the user to customize the view, filter data, and drill down into specific details as desired. The goal is to provide a comprehensive and coherent experience that empowers the user to leverage the full potential of the integrated production automation system for data-driven decision-making.

To further enhance the decision-making capabilities of the end user, the client visualization dashboard can be equipped with a feature that suggests AI models based on the type of data being monitored and the specific industrial platform in use. This intelligent recommendation system utilizes metadata from the IoT devices and contextual information from the industrial platform to determine the AI models that are likely to yield beneficial insights for the given scenario. For example, in a drilling operation, the system may suggest AI models that specialize in predicting drill bit wear or optimizing drilling speed based on the real-time torque and pressure data being monitored.

Additionally, the dashboard provides the end user with the option to manually select AI models from a displayed list. This list is dynamically generated and updated, presenting the user with a curated selection of AI models that are compatible with the current data and operational context. Experienced users can leverage their domain knowledge to choose specific models that they believe will provide the desired analysis. This manual selection process is facilitated by an intuitive interface that offers detailed descriptions of each model's capabilities and intended use cases, allowing users to make informed choices about which models to apply to their data.

The combination of automated AI model suggestions and manual selection options ensures that users at all levels of expertise can effectively interact with the system to obtain actionable insights. Whether through system-generated recommendations or user-driven model selection, the dashboard serves as a central hub for accessing and deploying the advanced analytical power of the integrated production automation system.

While the foregoing is directed to example embodiments described herein, other and further example embodiments may be devised without departing from the basic scope thereof. For example, aspects of the present disclosure may be implemented in hardware or software or a combination of hardware and software. One example embodiment described herein may be implemented as a program product for use with a computer system. The program(s) of the program product defines functions of the example embodiments (including the methods described herein) and may be contained on a variety of computer-readable storage media. Illustrative computer-readable storage media include, but are not limited to: (i) non-writable storage media (e.g., read-only memory (ROM) devices within a computer, such as CD-ROM disks readably by a CD-ROM drive, flash memory, ROM chips, or any type of solid-state non-volatile memory) on which information is permanently stored; and (ii) writable storage media (e.g., floppy disks within a diskette drive or hard-disk drive or any type of solid-state random-access memory) on which alterable information is stored. Such computer-readable storage media, when carrying computer-readable instructions that direct the functions of the disclosed example embodiments, are example embodiments of the present disclosure.

It will be appreciated by those skilled in the art that the preceding examples are exemplary and not limiting. It is intended that all permutations, enhancements, equivalents, and improvements thereto are apparent to those skilled in the art upon a reading of the specification and a study of the drawings are included within the true spirit and scope of the present disclosure. It is therefore intended that the following appended claims include all such modifications, permutations, and equivalents as fall within the true spirit and scope of these teachings.

What is claimed is:

1. A system for processing and managing data in Internet of Things (IoT) systems, the system comprising:
   an interoperable digital architecture configured for real-time multi-frequency data collection and processing from various IoT devices and sensors in real-time;
   an automated event detection module integrated within the interoperable digital architecture, configured to detect events from the IoT devices and sensors in real-time and manage multi-frequency data;

a modular AI module integrated within the interoperable digital architecture, in communication with the automated event detection module, and configured to process the multi-frequency data in real-time, wherein the modular AI module receives the multi-frequency data from the automated event detection module, and processes it in parallel using a plurality of AI algorithms; and a data sorting module integrated within the interoperable digital architecture, in communication with the modular AI module, configured to sort the processed multi-frequency data and send it to predefined database destinations across multiple cloud environments;

wherein processing the received multi-frequency data from the automated event detection module includes:
    segregating raw multi-frequency data and processed multi-frequency data to facilitate efficient data management and retrieval; and
    hashing the raw multi-frequency data to assure the integrity of the data for at least one of tokenization or blockchain applications.

2. The system of claim 1, wherein the automated event detection module is configured to process complex structures of the multi-frequency data from the IoT systems in real-time.

3. The system of claim 1, wherein the data sorting module is further configured to send the processed multi-frequency data to the predefined database destinations across the multiple cloud environments, regardless of a design of the multiple cloud environments or data structure requirements.

4. The system of claim 1, wherein the modular AI module is further configured to process the multi-frequency data in separate aggregated containers, thereby increasing computational efficiency.

5. The system of claim 4, wherein the modular AI module is further configured to parallelize the AI processing for simultaneous logic layers in real-time.

6. The system of claim 1, further comprising an automated alarm system configured for event recognition and data processing.

7. The system of claim 1, further comprising automated signed URLs with digital tokens for signature identification, ensuring secure and efficient data transfer.

8. The system of claim 1, wherein the modular AI module further comprises multiple AI models operating in parallel, each AI model configured to process a subset of the multi-frequency data simultaneously, thereby increasing computational efficiency and enabling real-time processing of the multi-frequency data.

9. A method for processing and managing data in Internet of Things (IoT) systems, the method comprising:

collecting multi-frequency data in real-time from various IoT devices and sensors using an interoperable digital architecture configured for real-time multi-frequency data collection and processing;

detecting events from the IoT devices and sensors in real-time and managing multi-frequency data using an automated event detection module integrated within the interoperable digital architecture;

processing the multi-frequency data in real-time using a modular AI module integrated within the interoperable digital architecture, in communication with the automated event detection module, wherein the modular AI module receives the multi-frequency data from the automated event detection module, and processes it in parallel using a plurality of AI algorithms; and sorting the processed multi-frequency data and sending it to predefined database destinations across multiple cloud environments using a data sorting module integrated within the interoperable digital architecture, in communication with the modular AI module;

wherein processing the received multi-frequency data from the automated event detection module includes:
    segregating raw multi-frequency data and processed multi-frequency data to facilitate efficient data management and retrieval and
    hashing the raw multi-frequency data to assure the integrity of the data for at least one of tokenization or blockchain applications.

10. The method of claim 9, wherein the detecting events includes processing complex structures of data from the IoT systems in real-time.

11. The method of claim 9, wherein sorting the processed multi-frequency data includes sending the processed multi-frequency data to the predefined database destinations across the multiple cloud environments, regardless of a design of the multiple cloud environments or data structure requirements.

12. The method of claim 9, wherein processing the multi-frequency data includes processing the multi-frequency data in separate aggregated containers, thereby increasing computational efficiency.

13. The method of claim 12, wherein processing the multi-frequency data further includes parallelizing AI processing for simultaneous logic layers in real-time.

14. The method of claim 9, further comprising recognizing the events and processing data using an automated alarm system.

15. The method of claim 9, further comprising generating automated signed URLs with digital tokens for signature identification, ensuring secure and efficient data transfer.

16. The method of claim 9, wherein processing the multi-frequency data further comprises operating multiple AI models in parallel, each AI model configured to process a subset of the multi-frequency data simultaneously, thereby increasing computational efficiency and enabling real-time processing of the multi-frequency data.

\* \* \* \* \*